(12) United States Patent
Senekerimyan et al.

(10) Patent No.: US 8,000,212 B2
(45) Date of Patent: Aug. 16, 2011

(54) METROLOGY FOR EXTREME ULTRAVIOLET LIGHT SOURCE

(75) Inventors: Vahan Senekerimyan, San Diego, CA (US); Nam-Hyong Kim, San Diego, CA (US); Robert A. Bergstedt, Carlsbad, CA (US); Igor V. Fomenkov, San Diego, CA (US); William N. Partlo, Poway, CA (US)

(73) Assignee: Cymer, Inc., San Diego, CA (US)

( * ) Notice: Subject to any disclaimer, the term of this patent is extended or adjusted under 35 U.S.C. 154(b) by 26 days.

(21) Appl. No.: 12/637,961

(22) Filed: Dec. 15, 2009

(65) Prior Publication Data

US 2011/0141865 A1    Jun. 16, 2011

(51) Int. Cl.
    *G11B 7/00*    (2006.01)
(52) U.S. Cl. .............. 369/121; 369/112.01; 250/504 R
(58) Field of Classification Search .................. None
    See application file for complete search history.

(56) References Cited

U.S. PATENT DOCUMENTS

| | | | |
|---|---|---|---|
| 5,577,092 | A | 11/1996 | Kublak et al. |
| 5,813,987 | A * | 9/1998 | Modell et al. ............ 600/473 |
| 6,549,551 | B2 | 4/2003 | Ness et al. |
| 6,567,450 | B2 | 5/2003 | Myers et al. |
| 6,625,191 | B2 | 9/2003 | Knowles et al. |
| 6,972,421 | B2 | 12/2005 | Melnychuk et al. |
| 7,491,954 | B2 | 2/2009 | Bykanov et al. |
| 7,598,509 | B2 | 10/2009 | Ershov et al. |
| 2003/0128368 | A1 | 7/2003 | Kuchel |
| 2005/0024743 | A1 | 2/2005 | Camy-Peyret |
| 2007/0016074 | A1 | 1/2007 | Abreu |
| 2009/0154642 | A1 | 6/2009 | Bykanov et al. |
| 2009/0314967 | A1 * | 12/2009 | Moriya et al. ............ 250/504 R |
| 2010/0117009 | A1 * | 5/2010 | Moriya et al. ............ 250/504 R |

FOREIGN PATENT DOCUMENTS

| | | |
|---|---|---|
| JP | 2008-103151 | 1/2008 |
| JP | 2008-042048 | 2/2008 |

OTHER PUBLICATIONS

Technical Data Sheet for "Reflection and Material Properties for CO2 Laser Metal Mirrors used at 10.6um," II-VI Infrared, created Feb. 18, 2008, 2 pages, published online at www.iiviinfrared.com.
U.S. Appl. No. 61/200,222, filed Nov. 24, 2008.
U.S. Appl. No. 12/592,107, filed Nov. 18, 2009.
U.S. Appl. No. 61/168,033, filed Apr. 9, 2009.
International Search Report issued in counterpart application PCT/US10/59277 by Lee W. Young of the US International Searching Authority on Feb. 17, 2011, 2 pages.
Written Opinion issued in counterpart application PCT/US10/59277 by Lee W. Young of the US International Searching Authority on Feb. 17, 2011, 7 pages.

* cited by examiner

*Primary Examiner* — Muhammad N Edun
(74) *Attorney, Agent, or Firm* — DiBerardino Law LLC

(57) ABSTRACT

An extreme ultraviolet light system includes a drive laser system that produces an amplified light beam; a target material delivery system configured to produce a target material at a target location; a beam delivery system configured to receive the amplified light beam emitted from the drive laser system and to direct the amplified light beam toward the target location; and a metrology system. The beam delivery system includes converging lens configured and arranged to focus the amplified light beam at the target location. The metrology system includes a light collection system configured to collect a portion of the amplified light beam reflected from the converging lens and a portion of a guide laser beam reflected from the converging lens. The light collection system includes a dichroic optical device configured to optically separate the portions.

31 Claims, 11 Drawing Sheets

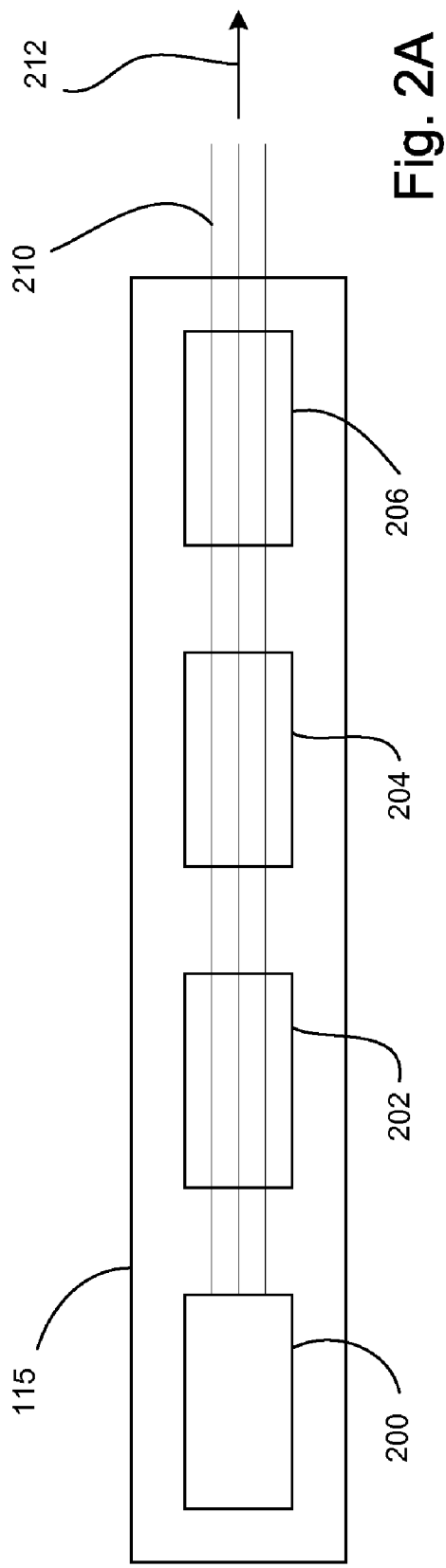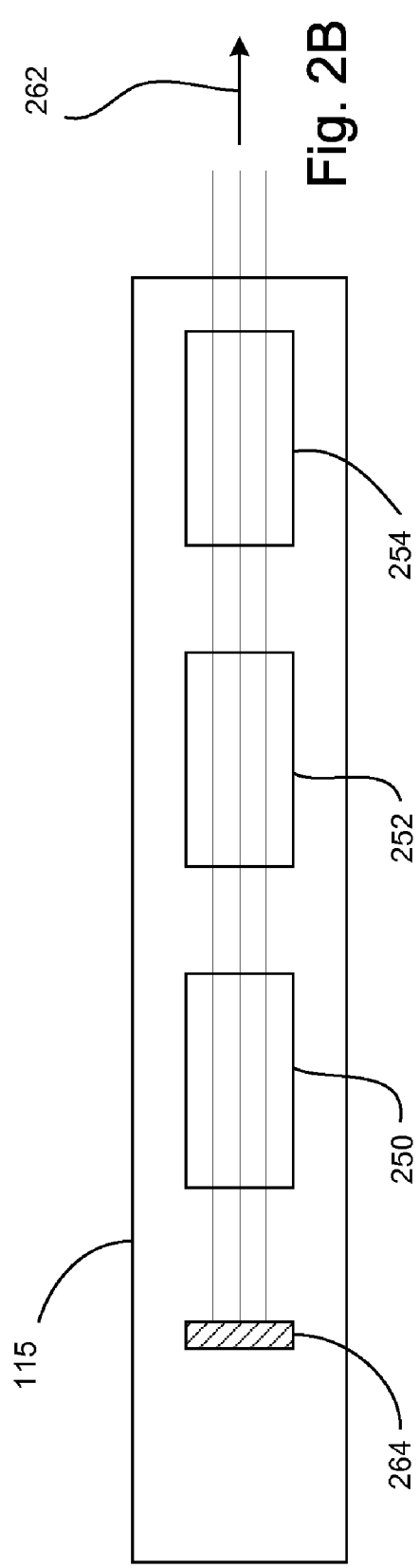

METROLOGY FOR EXTREME ULTRAVIOLET LIGHT SOURCE

TECHNICAL FIELD

The disclosed subject matter relates to a metrology system for an extreme ultraviolet light source.

BACKGROUND

Extreme ultraviolet ("EUV") light, for example, electromagnetic radiation having wavelengths of around 50 nm or less (also sometimes referred to as soft x-rays), and including light at a wavelength of about 13 nm, can be used in photolithography processes to produce extremely small features in substrates, for example, silicon wafers.

Methods to produce EUV light include, but are not necessarily limited to, converting a material into a plasma state that has an element, for example, xenon, lithium, or tin, with an emission line in the EUV range. In one such method, often termed laser produced plasma ("LPP"), the required plasma can be produced by irradiating a target material, for example, in the form of a droplet, stream, or cluster of material, with an amplified light beam that can be referred to as a drive laser. For this process, the plasma is typically produced in a sealed vessel, for example, a vacuum chamber, and monitored using various types of metrology equipment.

$CO_2$ amplifiers and lasers, which output an amplified light beam at a wavelength of about 10600 nm, can present certain advantages as a drive laser irradiating the target material in an LPP process. This may be especially true for certain target materials, for example, for materials containing tin. For example, one advantage is the ability to produce a relatively high conversion efficiency between the drive laser input power and the output EUV power. Another advantage of $CO_2$ drive amplifiers and lasers is the ability of the relatively long wavelength light (for example, as compared to deep UV at 198 nm) to reflect from relatively rough surfaces such as a reflective optic that has been coated with tin debris. This property of 10600 nm radiation can allow reflective mirrors to be employed near the plasma for, for example, steering, focusing and/or adjusting the focal power of the amplified light beam.

SUMMARY

In some general aspects, an extreme ultraviolet light system includes a drive laser system that produces an amplified light beam; a target material delivery system configured to produce a target material at a target location within a vacuum space defined within a chamber, a beam delivery system including a set of optical components; a metrology system; and a controller. The beam delivery system is configured to receive the amplified light beam emitted from the drive laser system and to direct the amplified light beam toward the target location. The vacuum chamber houses an extreme ultraviolet light collector configured to collect extreme ultraviolet light emitted from the target material when the amplified light beam crosses the target location and strikes the target material. The metrology system includes a light collection system, and an optical sensor. The light collection system is configured to collect at least a diagnostic portion of the amplified light beam not reaching the target location and at least a diagnostic portion of a guide laser beam not reaching the target location. The light collection system includes a dichroic optical device configured to separate the diagnostic portions by transmitting substantially all of one of the portions and reflecting substantially all of the other of the portions, the at least two diagnostic portions having distinct wavelengths. The optical sensor captures the at least two diagnostic portions separated by the dichroic optical device. The controller is connected to the optical sensor and to at least one component within the beam delivery system to modify a position of the at least one component based on the output of the optical sensor.

Implementations can include one or more of the following features. For example, the beam delivery system can include a beam expansion system that expands a size of the amplified light beam; and a focusing element configured and arranged to focus the amplified light beam at the target location.

The focusing element can include a converging lens. The converging lens can be an aspheric lens. The converging lens can be made of zinc selenide. The converging lens can include an anti-reflective coating and can transmit at least 95% of the light at the wavelength of the amplified light beam. The converging lens can form a pressure-resistant window of the vacuum chamber to separate the vacuum within the vacuum chamber from an environment external to the vacuum chamber. The converging lens can have a numerical aperture of at least 0.25.

The beam delivery system can include an actuation system mechanically coupled to the converging lens, where the actuation system is configured to receive a control signal from the controller and to move the converging lens to adjust a focus of the amplified light beam based on the control signal.

The light collection system can be configured to collect the amplified light beam reflected by a surface of the converging lens.

The beam delivery system can include a pre-lens mirror that redirects the amplified light beam from the beam expansion system toward the converging lens. The beam delivery system can include an actuation system mechanically coupled to the pre-lens mirror, where the actuation system is configured to receive a control signal from the controller and to move the pre-lens mirror to adjust a focus of the amplified light beam based on the control signal.

The controller can be configured to provide an output signal to an actuation system coupled to the at least one component to modify the position of the at least one component to increase the overlap between the amplified light beam and the target material at the target location to thereby increase generation of extreme ultraviolet light within the chamber.

The metrology system can be a closed-loop feedback system.

The system can include a guide laser that produces the guide laser beam. The amplified light beam can be at a first distinct wavelength and the guide laser beam can be at a second distinct wavelength. The dichroic optical device can be configured to separate the amplified light beam diagnostic portion from the guide laser beam diagnostic portion by reflecting substantially the entire amplified light beam diagnostic portion and transmitting substantially the entire guide laser beam diagnostic portion.

In other general aspects, extreme ultraviolet light is produced by producing a target material at a target location within a vacuum defined by a chamber; supplying pump energy to a gain medium of at least one optical amplifier in a drive laser system to produce an amplified light beam; adjusting one or more properties of the amplified light beam and directing the amplified light beam through a set of optical components to the target location; directing a guide laser beam to the target location; collecting at least a portion of the amplified light beam that does not reach the target location and at least a portion of the guide laser beam that does not reach the target location; and separating the collected amplified light beam portion from the collected guide laser beam portion by directing the collected amplified light beam portion and the collected guide laser beam portion to a dichroic optical device such that one of the collected portions is transmitted through the dichroic optical device and the other of the collected portions is reflected from the dichroic optical device.

Implementations can include one or more of the following features. For example, the separated portions can be directed to an optical sensor that outputs image data of the separated portions.

The image data of each of the separated portions can be directed to an analysis module, the analysis module being configured to perform one or more of determine a beam size of the image data for each of the separated portions, and determine a centroid of the image data for each of the separated portions.

A position of one or more components of the optical component set can be adjusted based on one or more of the determined beam size and the determined centroid.

The amplified light beam can be directed through a set of optical components by reflecting the amplified light beam off a mirror, and directing the reflected amplified light beam through a focusing element that captures the amplified light beam and focuses the amplified light beam to the target location. The portions can be collected by collecting portions that are reflected off the converging lens and back through an opening within the mirror.

In other general aspects, an extreme ultraviolet light system includes a drive laser system that produces an amplified light beam; a target material delivery system, a beam delivery system, and a metrology system. The target material delivery system is configured to produce a target material at a target location within a vacuum space defined within a chamber. The vacuum chamber houses an extreme ultraviolet light collector configured to collect extreme ultraviolet light emitted from the target material when the amplified light beam crosses the target location and strikes the target material. The beam delivery system is configured to receive the amplified light beam emitted from the drive laser system and to direct the amplified light beam toward the target location. The beam delivery system includes a set of optical components including a converging lens configured and arranged to focus the amplified light beam at the target location. The metrology system includes a light collection system configured to collect a portion of the amplified light beam reflected from the converging lens and a portion of a guide laser beam reflected from the converging lens. The light collection system includes a dichroic optical device configured to separate the portions by transmitting a first of the portions and reflecting a second of the portions.

Implementations can include one or more of the following features. For example, the system can also include an optical sensor that captures the portions separated by the dichroic optical device, and a controller connected to the optical sensor and to at least one component within the beam delivery system to modify a position of the at least one component based on an output from the optical sensor. The controller can be configured to provide an output signal to an actuation system coupled to the at least one component of the beam delivery system to modify the position of the at least one component to increase the overlap between the amplified light beam and the target material at the target location to thereby increase generation of extreme ultraviolet light within the chamber.

The system can include an actuation system mechanically coupled to the converging lens, where the actuation system is configured to receive a control signal from the controller and to move the converging lens to adjust a focus of the amplified light beam based on the control signal.

The beam delivery system can include a pre-lens mirror that redirects the amplified light beam from the beam expansion system toward the converging lens. The amplified light beam portion and the guide laser beam portion reflected from the converging lens can be directed through an opening within the pre-lens mirror before reaching the dichroic optical device. The beam delivery system can include an actuation system mechanically coupled to the pre-lens mirror. The actuation system can be configured to receive a control signal from the controller and to move the pre-lens mirror to adjust a focus of the amplified light beam based on the control signal.

The converging lens can form a pressure-resistant window of the vacuum chamber to separate the vacuum space from an exterior space.

The amplified light beam can be at a first distinct wavelength. The system can also include a guide laser that produces the guide laser beam that is at a second distinct wavelength.

The beam delivery system can include a beam expansion system that expands a size of the amplified light beam. The converging lens can be configured and arranged to receive the expanded amplified light beam from the beam expansion system.

The converging lens can have a numerical aperture of at least 0.25.

The system can also include a guide laser that produces the guide laser beam. In this case, the amplified light beam can be at a first distinct wavelength and the guide laser beam is at a second distinct wavelength; and the dichroic optical device can be configured to separate the amplified light beam portion from the guide laser beam portion by reflecting substantially all of the amplified light beam diagnostic portion and transmitting substantially all of the guide laser beam diagnostic portion.

In another general aspect, extreme ultraviolet light can be produced by producing a target material at a target location within a vacuum defined by a chamber; supplying pump energy to a gain medium of at least one optical amplifier in a drive laser system to produce an amplified light beam; adjusting one or more properties of the amplified light beam; directing a guide laser beam to the target location; collecting at least a portion of the amplified light beam and at least a portion of the guide laser beam that reflect from a surface of the converging lens; and separating the collected amplified light beam portion from the collected guide laser beam portion. The one or more properties are adjusted by directing the amplified light beam through a set of optical components including directing the amplified light beam through a converging lens configured and arranged to focus the amplified light beam at the target location. The collected amplified light beam portion can be separated from the collected guide laser beam portion by directing the collected amplified light beam portion and the collected guide laser beam portion to a dichroic optical device such that one of the collected portions is transmitted through the dichroic optical device and the other of the collected portions is reflected from the dichroic optical device.

Implementations can include one or more of the following features. For example, the separated portions can be directed to an optical sensor that outputs image data of the separated portions. The image data of each of the separated portions can be directed to an analysis module. The analysis module can be configured to perform one or more of the following: determine a beam size of the image data for each of the separated portions, and determine a centroid of the image data for each of the separated portions. A position of one or more components of the optical component set can be adjusted based on one or more of the determined beam size and the determined centroid.

The amplified light beam can be directed through a set of optical components by reflecting the amplified light beam off a mirror prior to directing the amplified light beam through the converging lens. The portions can be collected by collecting portions that are reflected off the converging lens and back through an opening within the mirror.

DRAWING DESCRIPTION

FIG. 2A is a block diagram of an exemplary drive laser system that can be used in the light source of FIG. 1;

FIG. 2B is a block diagram of an exemplary drive laser system that can be used in the light source of FIG. 1;

DESCRIPTION

Figure 1:
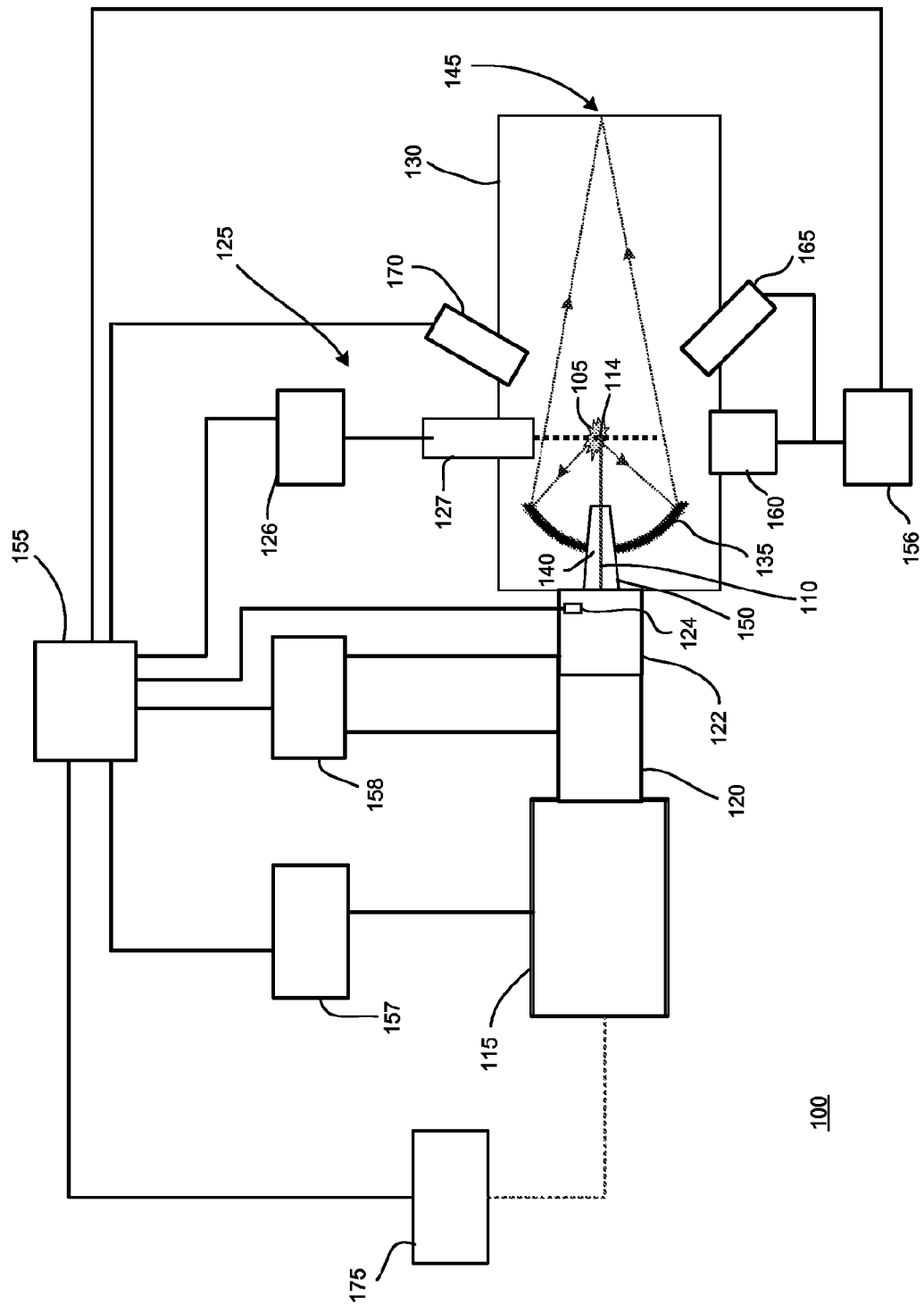
FIG. 1 is a block diagram of a laser produced plasma extreme ultraviolet light source.

Referring to FIG. 1, an LPP EUV light source 100 is formed by irradiating a target material 114 at a target location 105 within a vacuum chamber 130 with an amplified light beam 110 to convert the target material into a plasma state that has an element with an emission line in the EUV range. The light source 100 includes a drive laser system 115 that produces the amplified light beam due to a population inversion within the gain medium or mediums of the laser system 115.

The light source 100 also includes a beam delivery system between the laser system 115 and the target location 105, the beam delivery system including a beam transport system 120 and a focus assembly 122. The beam transport system 120 receives the amplified light beam 110 from the laser system 115, and steers and modifies the amplified light beam 110 as needed and outputs the amplified light beam 110 to the focus assembly 122. The focus assembly 122 receives the amplified light beam 110 and focuses the beam 110 to the target location 105.

As discussed below, the beam transport system 120 includes, among other components, a beam expansion system that expands the beam 110 between the laser system 115 and the focus assembly 122. As also discussed below, the focus assembly 122 includes, among other components, a lens that focuses the beam 110 onto the target location 105 and a metrology system 124 that performs diagnostics on the beam 110. Before providing details about the beam transport system 120, the focus assembly 122, and the metrology system 124, a general description of the light source 100 is provided with reference to FIG. 1.

The light source 100 includes a target material delivery system 125, for example, delivering the target material 114 in the form of liquid droplets, a liquid stream, solid particles or clusters, solid particles contained within liquid droplets or solid particles contained within a liquid stream. The target material 114 can include, for example, water, tin, lithium, xenon, or any material that, when converted to a plasma state, has an emission line in the EUV range. For example, the element tin can be used as pure tin (Sn), as a tin compound, for example, $SnBr_4$, $SnBr_2$, $SnH_4$, as a tin alloy, for example, tin-gallium alloys, tin-indium alloys, tin-indium-gallium alloys, or any combination of these alloys. The target material 114 can include a wire coated with one of the above elements, such as tin. If the target material is in a solid state, it can have any suitable shape, such as a ring, a sphere, or a cube. The target material 114 can be delivered by the target material delivery system 125 into the interior of a chamber 130 and to the target location 105. The target location 105 is also referred to as an irradiation site, the place where the target material 114 is irradiated by the amplified light beam 110 to produce plasma.

In some implementations, the laser system 115 can include one or more optical amplifiers, lasers, and/or lamps for providing one or more main pulses and, in some cases, one or more pre-pulses. Each optical amplifier includes a gain medium capable of optically amplifying the desired wavelength at a high gain, an excitation source, and internal optics. The optical amplifier may or may not have laser mirrors or other feedback devices that form a laser cavity. Thus, the laser system 115 produces an amplified light beam 110 due to the population inversion in the gain media of the laser amplifiers even if there is no laser cavity. Moreover, the laser system 115 can produce an amplified light beam 110 that is a coherent laser beam if there is a laser cavity to provide enough feedback to the laser system 115. The term "amplified light beam" encompasses one or more of: light from the laser system 115 that is merely amplified but not necessarily a coherent laser oscillation and light from the laser system 115 that is amplified and is also a coherent laser oscillation.

The optical amplifiers in the laser system 115 can include as a gain medium a filling gas that includes CO2 and can amplify light at a wavelength of between about 9100 and about 11000 nm, and in particular, at about 10600 nm, at a gain greater than or equal to 1000. Suitable amplifiers and lasers for use in the laser system 115 can include a pulsed laser device, for example, a pulsed, gas-discharge $CO_2$ laser device producing radiation at about 9300 nm or about 10600 nm, for example, with DC or RF excitation, operating at relatively high power, for example, 10 kW or higher and high pulse repetition rate, for example, 50 kHz or more. The optical amplifiers in the laser system 115 can also include a cooling system such as water that can be used when operating the laser system 115 at higher powers.

Referring to FIG. 2A, in one particular implementation, the laser system 115 has a master oscillator/power amplifier (MOPA) configuration with multiple stages of amplification and having a seed pulse that is initiated by a Q-switched master oscillator (MO) 200 with low energy and high repetition rate, for example, capable of 100 kHz operation. From the MO 200, the laser pulse can be amplified, for example, using RF pumped, fast axial flow, $CO_2$ amplifiers 202, 204, 206 to produce an amplified light beam 210 traveling along a beam path 212.

Although three optical amplifiers 202, 204, 206 are shown, it is possible that as few as one amplifier and more than three amplifiers could be used in this implementation. In some implementations, each of the $CO_2$ amplifiers 202, 204, 206 can be an RF pumped axial flow $CO_2$ laser cube having a 10 meter amplifier length that is folded by internal mirrors.

Alternatively, and with reference to FIG. 2B, the drive laser system 115 can be configured as a so-called "self-targeting" laser system in which the target material 114 serves as one mirror of the optical cavity. In some "self-targeting" arrangements, a master oscillator may not be required. The laser system 115 includes a chain of amplifier chambers 250, 252, 254, arranged in series along a beam path 262, each chamber having its own gain medium and excitation source, for example, pumping electrodes. Each amplifier chamber 250, 252, 254, can be an RF pumped, fast axial flow, $CO_2$ amplifier chamber having a combined one pass gain of, for example, 1,000-10,000 for amplifying light of a wavelength $\lambda$ of, for example, 10600 nm. Each of the amplifier chambers 250, 252, 254 can be designed without laser cavity (resonator) mirrors so that when set up alone they do not include the optical components needed to pass the amplified light beam through the gain medium more than once. Nevertheless, as mentioned above, a laser cavity can be formed as follows.

In this implementation, a laser cavity can be formed by adding a rear partially reflecting optic 264 to the laser system 115 and placing the target material 114 at the target location 105. The optic 264 can be, for example, a flat mirror, a curved mirror, a phase-conjugate mirror, or a corner reflector having a reflectivity of about 95% for wavelengths of about 10600 nm (the wavelength of the amplified light beam 110 if $CO_2$ amplifier chambers are used).

The target material 114 and the rear partially reflecting optic 264 act to reflect some of the amplified light beam 110 back into the laser system 115 to form the laser cavity. Thus, the presence of the target material 114 at the target location 105 provides enough feedback to cause the laser system 115 to produce coherent laser oscillation and in this case, the amplified light beam 110 can be considered a laser beam. When the target material 114 isn't present at the target location 105, the laser system 115 may still be pumped to produce the amplified light beam 110 but it would not produce a coherent laser oscillation unless some other component within the source 100 provides enough feedback. In particular, during the intersection of the amplified light beam 110 with the target material 114, the target material 114 may reflect light along the beam path 262, cooperating with the optic 264 to establish an optical cavity passing through the amplifier chambers 250, 252, 254. The arrangement is configured so the reflectivity of the target material 114 is sufficient to cause optical gains to exceed optical losses in the cavity (formed from the optic 264 and the droplet) when the gain medium within each of the chambers 250, 252, 254 is excited generating a laser beam for irradiating the target material 114, creating a plasma, and producing an EUV light emission within the chamber 130. With this arrangement, the optic 264, amplifiers 250, 252, 254, and the target material 114 combine to form a so-called "self-targeting" laser system in which the target material 114 serves as one mirror (a so-called plasma mirror or mechanical q-switch) of the optical cavity. Self-targeting laser systems are disclosed in U.S. application Ser. No. 11/580,414 filed on Oct. 13, 2006 entitled, DRIVE LASER DELIVERY SYSTEMS FOR EUV LIGHT SOURCE, Attorney Docket Number 2006-0025-01, the entire contents of which are hereby incorporated by reference herein.

Depending on the application, other types of amplifiers or lasers can also be suitable, for example, an excimer or molecular fluorine laser operating at high power and high pulse repetition rate. Examples include a solid state laser, for example, having a fiber or disk shaped gain medium, a MOPA configured excimer laser system, as shown, for example, in U.S. Pat. Nos. 6,625,191; 6,549,551; and 6,567,450; an excimer laser having one or more chambers, for example, an oscillator chamber and one or more amplifying chambers (with the amplifying chambers in parallel or in series); a master oscillator/power oscillator (MOPO) arrangement, a power oscillator/power amplifier (POPA) arrangement; or a solid state laser that seeds one or more excimer or molecular fluorine amplifier or oscillator chambers, may be suitable. Other designs are possible.

At the irradiation site, the amplified light beam 110, suitably focused by the focus assembly 122, is used to create plasma having certain characteristics that depend on the composition of the target material 114. These characteristics can include the wavelength of the EUV light produced by the plasma and the type and amount of debris released from the plasma.

The light source 100 includes a collector mirror 135 having an aperture 140 to allow the amplified light beam 110 to pass through and reach the target location 105. The collector mirror 135 can be, for example, an ellipsoidal mirror that has a first focus at the target location 105 and a second focus at an intermediate location 145 (also called an intermediate focus) where the EUV light can be output from the light source 100 and can be input to, for example, an integrated circuit lithography tool (not shown). The light source 100 can also include an open-ended, hollow conical shroud 150 (for example, a gas cone) that tapers toward the target location 105 from the collector mirror 135 to reduce the amount of plasma-generated debris that enters the focus assembly 122 and/or the beam transport system 120 while allowing the amplified light beam 110 to reach the target location 105. For this purpose, a gas flow can be provided in the shroud that is directed toward the target location 105.

The light source 100 can also include a master controller 155 that is connected to a droplet position detection feedback system 156, a laser control system 157, and a beam control system 158. The master controller 155 can be a general purpose computer that includes software and memory, the software including instructions that cause one or more output devices connected to the controller 155 to perform certain functions.

The light source 100 can include one or more target or droplet imagers 160 that provide an output indicative of the position of a droplet, for example, relative to the target location 105 and provide this output to the droplet position detection feedback system 156, which can, for example, compute a droplet position and trajectory from which a droplet position error can be computed either on a droplet by droplet basis or on average. The droplet position detection feedback system 156 thus provides the droplet position error as an input to the master controller 155. The master controller 155 can therefore provide a laser position, direction, and timing correction signal, for example, to the laser control system 157 that can be used, for example, to control the laser timing circuit and/or to the beam control system 158 to control an amplified light beam position and shaping of the beam transport system 120 to change the location and/or focal power of the beam focal spot within the chamber 130.

The target material delivery system 125 includes a target material delivery control system 126 that is operable in response to a signal from the master controller 155, for example, to modify the release point of the droplets as released by a delivery mechanism 127 to correct for errors in the droplets arriving at the desired target location 105.

Additionally, the light source 100 can include a light source detector 165 that measures one or more EUV light parameters, including but not limited to, pulse energy, energy distribution as a function of wavelength, energy within a particular band of wavelengths, energy outside of a particular band of wavelengths, and angular distribution of EUV intensity and/or average power. The light source detector 165 generates a feedback signal for use by the master controller 155. The feedback signal can be, for example, indicative of the errors in parameters such as the timing and focus of the laser pulses to properly intercept the droplets in the right place and time for effective and efficient EUV light production.

The light source 100 also includes a guide laser 175 that can be used to align various sections of the light source 100 or to assist in steering the amplified light beam 110 to the target location 105. The guide laser 175 produces a guide laser beam having a guide wavelength that is distinct from the operating wavelength of the laser system 115 and is within the wavelength range of the optical components within the laser system 115, the beam transport system 120, and the focus assembly 122. Moreover, the guide laser beam of the guide laser 175 should have enough power to pass through the optical components that need to be aligned yet have a relatively lower power than the amplified light beam 110. It is possible that the guide laser 175 could be operated at a greater power if the guide wavelength is farther away from the operating wavelength of the laser system 115 and outside the wavelength range of the optical components, though it is not preferable to operate the guide laser 175 in this manner because the amount of power required increases non-linearly (for example, exponentially) with the drop in efficiency that occurs as the guide wavelength is driven outside the wavelength range of the optical components. The guide laser 175 can operate while the laser system 115 is not producing the amplified light beam 110.

The guide laser 175 can be used to align components within the laser system 115, for example, to align an optical amplifier with another optical amplifier of the laser system 115. In this implementation, the guide laser 175 can be used to align the components during initial set up of the light source 100 and prior to EUV production in the chamber 130. EUV production in the chamber 130 requires not only that an amplified light beam 110 be produced, but also that the amplified light beam 110 be directed to the target location 105 and impinge upon the target material 114 to convert the target material into plasma that emits within the EUV range. Additionally, in this implementation, the guide laser 175 can also be used to align components within the beam delivery system to steer the amplified light beam 110 through the beam delivery system and to the target location 105. Therefore, in this implementation, the guide laser 175 can be used to align the components and the amplified light beam 110 while the gain media of the laser system 115 is inverted but is not producing coherent laser oscillation (in the case in which there is no laser cavity) or during EUV production in the chamber 130 (in which case, there is a laser cavity, and the laser system is producing coherent laser oscillation). Alignment occurs while the gain media are inverted to compensate for lensing that can occur within the inverted gain media that would not otherwise appear in the un-inverted gain media.

The guide laser 175 can be used in a second implementation to align the optical components within the beam delivery system and to steer the amplified light beam 110 toward the target location 105. In this implementation, the guide laser 175 can be used to align the optical components and the amplified light beam 110 while the gain media of the laser system 115 is inverted but not during production of coherent laser oscillation or during EUV production in the chamber 130 in which case, there is a laser cavity and the laser system is producing coherent laser oscillation.

In connection with the guide laser 175, the light source 100 includes the metrology system 124 that is placed within the focus assembly 122 to sample a portion of light from the guide laser 175 and the amplified light beam 110. In other implementations, the metrology system 124 is placed within the beam transport system 120.

A guide laser 175 can be selected that meets the criteria discussed above for a laser system 115 that includes as a gain medium in the optical amplifiers a filling gas that includes $CO_2$ and can amplify light at a wavelength between about 9100 and about 11500 nm, and, in particular, at about 11150 nm. Such a $CO_2$ laser can be purchased from Synrad, Inc. of Mukilteo, Wash.

In a first implementation, the guide laser 175 is a broadly tunable mid-IR external cavity laser based on quantum cascade technology. Such a laser could be tuned to a wavelength of about 8100 nm, for example, which is close enough to the operating wavelength of the $CO_2$ amplifiers and is within the wavelength range of the optical components that could be used in a setup for the $CO_2$ amplifiers. Such a quantum cascade laser can be purchased from Daylight Solutions of Poway, Calif.

In a second implementation, the guide laser 175 is a tunable $CO_2$ laser that can be grating tuned or gratingless tuned, with a range of selectable wavelengths that can be distinct from the $CO_2$ optical amplifiers used in the laser system 115 be selecting special optics in the cavity and/or $CO_2$ isotope gas fills. Such a laser can be purchased from Access Laser Company of Marysville, Wash. For example, if the guide laser 175 is a $CO_2$ laser that uses a $CO_2$ isotope as the gain medium, the guide wavelength can be selected to be about 11150 nm, or any wavelength between 9000 and 11500 nm.

The metrology system 124 can include an optical element that samples or re-directs a subset or portion of the amplified light beam 110 and the guide laser beam, such optical element being made out of any material that can withstand the powers of the guide laser beam and the amplified light beam 110. Because the wavelengths of the amplified light beam 110 and guide laser beam are distinct from each other, they can be separated using a dichroic optical device (such as a dichroic mirror or dichroic filter) that is placed within the focus assembly 122 to separate a diagnostic portion of the amplified light beam 110 from a diagnostic portion of the guide laser 175 and to provide for separate analyses. A beam analysis system is formed from the metrology system 124 and the master controller 155 since the master controller 155 analyzes the sampled light from the guide laser 175 and uses this information to adjust components within the focus assembly 122 through the beam control system 158.

Thus, in summary, the light source 100 produces an amplified light beam 110 that is directed at the target material at the target location 105 to convert the target material into plasma that emits light in the EUV range. The amplified light beam 110 operates at a particular wavelength that is determined based on the design and properties of the laser system 115, as will be discussed in more detail below. Additionally, the amplified light beam 110 can be a laser beam when the target material provides enough feedback back into the laser system 115 to produce coherent laser light or if the drive laser system 115 includes suitable optical feedback to form a laser cavity.

As discussed above, the drive laser system 115 includes one or more optical amplifiers and several optical components (for example, about 20 to 50 mirrors), the beam transport system 120 and the focus assembly 122 include several optical components such as, for example, mirrors, lenses, and prisms. All of these optical components have a wavelength range that encompasses the wavelength of the amplified light beam 110 to permit efficient formation of the amplified light beam 110 and output of the amplified light beam 110 to the target location 105. Additionally, one or more of the optical components can be formed with a multilayer dielectric anti-reflective interference coating on a substrate.

Figure 3:
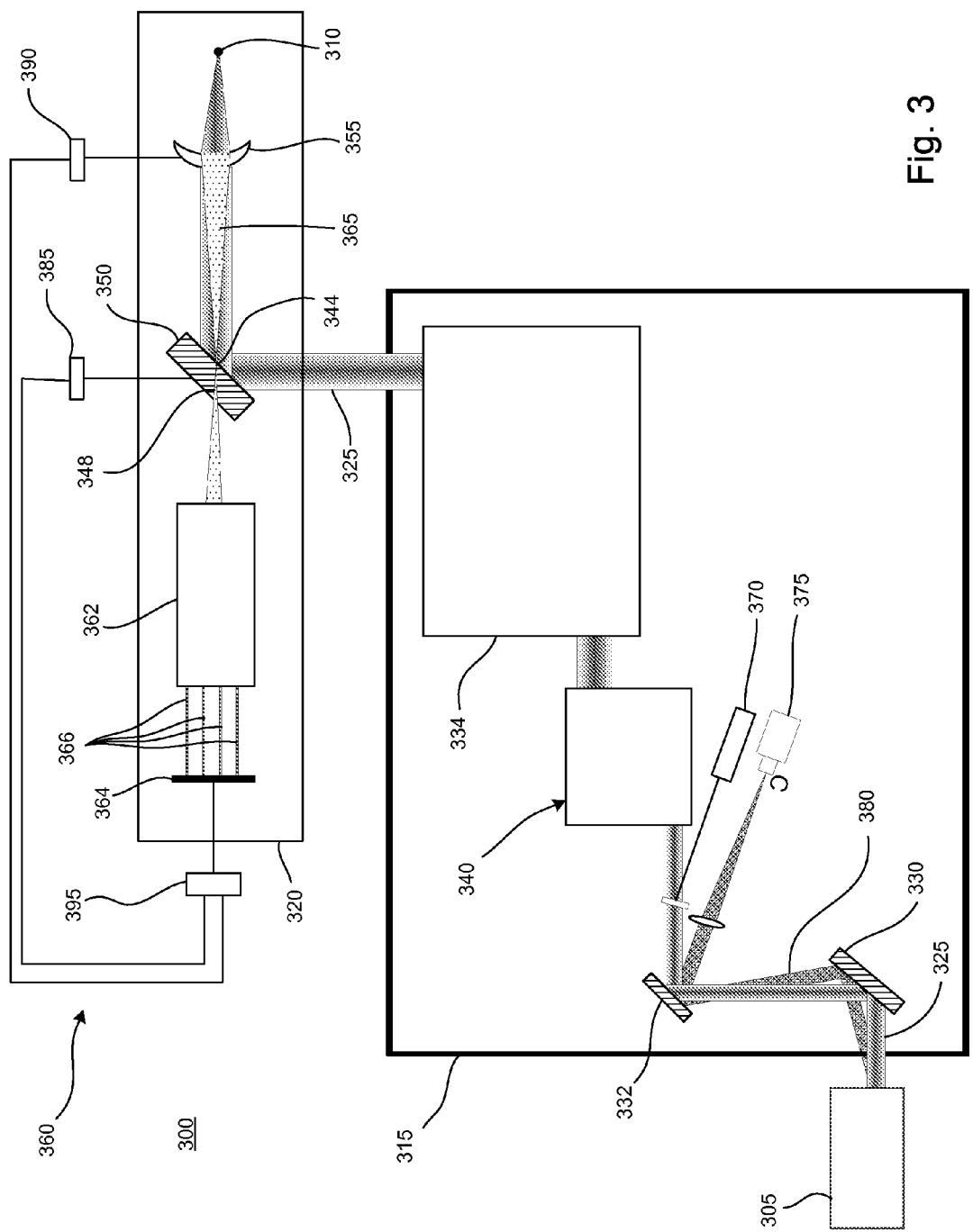
FIG. 3 is a block diagram of an exemplary beam delivery system positioned between a drive laser system and a target location of the light source of FIG. 1.

Referring to FIG. 3, an exemplary beam delivery system 300 is positioned between a drive laser system 305 and a target location 310, the beam delivery system including a beam transport system 315 and a focus assembly 320. The beam transport system 315 receives an amplified light beam 325 produced by the drive laser system 305, redirects and expands the amplified light beam 325, and then directs the expanded, redirected amplified light beam 325 toward the focus assembly 320. The focus assembly 320 focuses the amplified light beam 325 to the target location 310.

The beam transport system 315 includes optical components such as mirrors 330, 332 and other beam directing optics 334 that change the direction of the amplified light beam 325. The mirrors 330, 332, and beam directing optics 334 can be made of any substrates and coatings that are suitable for reflecting the amplified light beam 325. Thus, they can be made of substrates and coatings that are selected to reflect most light at the wavelength of the amplified light beam 325. In some implementations, one or more of the mirrors 330, 332, and beam directing optics 334 are made of a highly reflective coating such as maximum metal reflector (MMR) coating produced by II-VI Infrared of Saxonburg, Pa. over an oxygen-free high conductivity (OFHC) copper substrate. Other coatings that can be used include gold and silver, and other substrates to which the coating can be applied include silicon, molybdenum, and aluminum. One or more of the mirrors 330, 332, and the beam directing optics 334 can be water cooled, for example, by flowing water or some other appropriate coolant through their substrates.

The beam transport system 315 also includes a beam expansion system 340 that expands the amplified light beam 325 such that the transverse size of the amplified light beam 325 that exits the beam expansion system 340 is larger than the transverse size of the amplified light beam 325 that enters the beam expansion system 340. The beam expansion system 340 can include a curved mirror that has a reflective surface that is an off-axis segment of an elliptic paraboloid (such a mirror is also referred to as an off-axis paraboloid mirror). The beam expansion system 340 can include other optical components that are selected to redirect and expand or collimate the amplified light beam 325. Various designs for the beam expansion system 340 are described below in an application Ser. No. 12/638,092 entitled "Beam Transport System for Extreme Ultraviolet Light Source", having, and filed concurrently with this application, which is incorporated herein by reference in its entirety.

As shown in FIG. 3, the focus assembly 320 includes a mirror 350 and a focusing element that includes a converging lens 355 configured and arranged to focus the amplified light beam 325 reflected from the mirror 350 to the target location 310. The mirror 350 can be referred to as a pre-lens mirror and can be made of a substrate having a coating that is highly reflective at the wavelength of the amplified light beam 325. For example, the mirror 350 can have a maximum metal reflector (MMR) coating produced by II-VI Infrared of Saxonburg, Pa. over an oxygen-free high conductivity (OFHC) copper substrate. Other coatings that can be used for the mirror 350 include gold and silver, and other substrates to which the coating can be applied include silicon, molybdenum, and aluminum. The lens 355 is made of a material that can transmit at the wavelength of the amplified light beam 325.

The focus assembly 320 can also include a metrology system 360 that captures light 365 reflected from the lens 355. The light 365 includes at least a diagnostic portion of the amplified light beam 325 and a diagnostic portion of the light from the guide laser 175. This captured light can be used to analyze properties of the amplified light beam 325 and light from the guide laser 175, for example, to determine a position of the amplified light beam 325 and monitor changes in a focal length of the amplified light beam 325. Specifically, the captured light can be used to provide information regarding the position of the amplified light beam 325 on the lens 355, and to monitor focal length changes of the lens 355 due to changes in temperature (for example heating) of the lens 355.

The light 365 reflected from the lens 355 is converging to a focus that coincides with an opening of the mirror 350, as will be discussed in greater detail below. In this way, the mirror 350 opening provides a path for the light 365 to reach the metrology system 360 and also prevents the light 365 from re-entering the beam transport system 315 to prevent or reduce self lasing within the beam delivery system 300.

The metrology system 360 includes a light collection system 362 configured to collect the light 365, to separate the amplified light beam diagnostic portion from the guide laser beam portion, and to direct the separated diagnostic portions 366 toward an optical sensor 364. The light collection system 362 of the metrology system 360 includes an optical component such as a dichroic optical device (such as a dichroic mirror or a dichroic reflector) that separates the light 365 into a diagnostic amplified light beam and a diagnostic guide laser beam to permit separate analysis of each of these beams. The dichroic optical device is configured to separate the diagnostic portions by transmitting substantially all of one of the portions and reflecting substantially all of the other of the portions based on the wavelengths of each of the portions. In the implementations shown below, the dichroic optical device reflects light at the wavelength (for example, at about 10600 nm) of the amplified light beam 325 and transmits light at the wavelength (for example, about 11150 nm) of the light produced by the guide laser 175.

The optical sensor 364 captures the images of the diagnostic portions 366 separated within the light collection system 362 and outputs an image signal that is directed toward an analysis module 395. The analysis module 395 includes software that performs real time analysis on the images captured by the optical sensor 364 to determine the size and the centroid coordinates. The analysis module 395 can be a stand-alone device that connects to the master controller 155 or it can be integrated within the master controller 155. In some implementations, the analysis module 395 is a National Instruments PXI Box.

The analysis module 395 and/or the controller 155 is connected to at least one actuator 385, 390 associated with a component (for example, to the mirror 350 and/or the lens 355) within the beam delivery system 300 to modify a position or angle of the at least one component (for example, the lens 355 and/or one or more movable mirrors 350) of the beam delivery system 300 based on the values of the size and centroid coordinates to thereby increase overlap of the amplified light beam 325 with the target material 114 at the target location 105 and to therefore increase the amount of EUV production. The metrology system 360 includes other optical components such as filters, lenses, beam splitters, and mirrors to modify the light in other ways prior to reaching the detector 364.

In general, the converging lens 355 can be an aspheric lens to reduce spherical aberrations and other optical aberrations that can occur with spherical lens. The converging lens 355 can be mounted as a window on a wall of the chamber, can be mounted inside the chamber, or can be mounted external to the chamber. The lens 355 can be movable and therefore it can be mounted to one or more actuators to provide a mechanism for active focus control during operation of the system. In this way, the lens 355 can be moved to more efficiently collect the amplified light beam 325 and direct the light beam 325 to the target location to increase or maximize the amount of EUV production. The amount and direction of displacement of the lens 355 is determined based on the feedback provided by the metrology system 360, as described below.

The converging lens 355 has a diameter that is large enough to capture most of the amplified light beam 325 yet provide enough curvature to focus the amplified light beam 325 to the target location. In some implementations, the converging lens 355 can have a numerical aperture of at least 0.25. In some implementations, the converging lens 355 is made of ZnSe, which is a material that can be used for infrared applications. ZnSe has a transmission range covering 0.6 to 20 μm and can be used for high power light beams that are produced from high power amplifiers. ZnSe has a low thermal absorption in the red (specifically, the infrared) end of the electromagnetic spectrum. Other materials that can be used for the converging lens include, but aren't limited to: gallium arsenide (GaAs) and diamond. Moreover, the converging lens 355 can include an anti-reflective coating and can transmit at least 95% of the amplified light beam 325 at the wavelength of the amplified light beam 325.

Therefore, at least one of the mirrors 330, 332, 350 and components within the beam directing optics 334 can be movable with the use of a movable mount that is actuated by an actuation system that includes a motor that can be controlled by the master controller 155 to provide active pointing control of the amplified light beam 325 to the target location 310. The movable mirrors and beam directing optics can be adjusted to maintain the position of the amplified light beam 325 on the lens 355 and the focus of the amplified light beam 325 at the target material.

The beam delivery system 300 can also include an alignment laser 370 that is used during set up to align the location and angle or position of one or more of the components (such as the mirrors 330, 332, the beam directing optics 334, components within the beam expansion system 340, and the pre-lens mirror 350) of the beam delivery system 300. The alignment laser 370 can be a diode laser that operates in the visible spectrum to aid in a visual alignment of the components.

The beam delivery system 300 can also include a detection device 375 such as a camera that monitors light reflected off the target material 114 at the target location 310, such light reflects off a front surface of the drive laser system 305 to form a diagnostic beam 380 that can be detected at the detection device 375. The detection device 375 can be connected to the master controller 155.

The design of the metrology system 360, the mirror 350, and the lens 355 provides a more compact design than prior diagnostic arrangements in that there is no need to use additional optics in the path of the amplified light beam 325 to capture the light 365 for diagnostic purposes. Moreover, all of the diagnostic portions 366 can be captured with a single optical sensor 364 to reduce the amount of components needed for analysis. As mentioned above, the dichroic optical device is configured to separate the diagnostic portions by transmitting substantially all of one of the portions and reflecting substantially all of the other of the portions based on the wavelengths of each of the portions. It is therefore possible to separate the diagnostic light without the use of a diffraction grating, and therefore the stability of the diagnostic portions is improved and distortion within the diagnostic portions is reduced with the use of the dichroic optical device.

Also, the properties of the lens 355 are specified to the manufacturer of the lens 355 to assure that as much as amplified light beam 325 is transmitted as possible to the target location 310 while having enough light 365 back reflected at the lens 355 for the metrology system 360.

Figure 4:
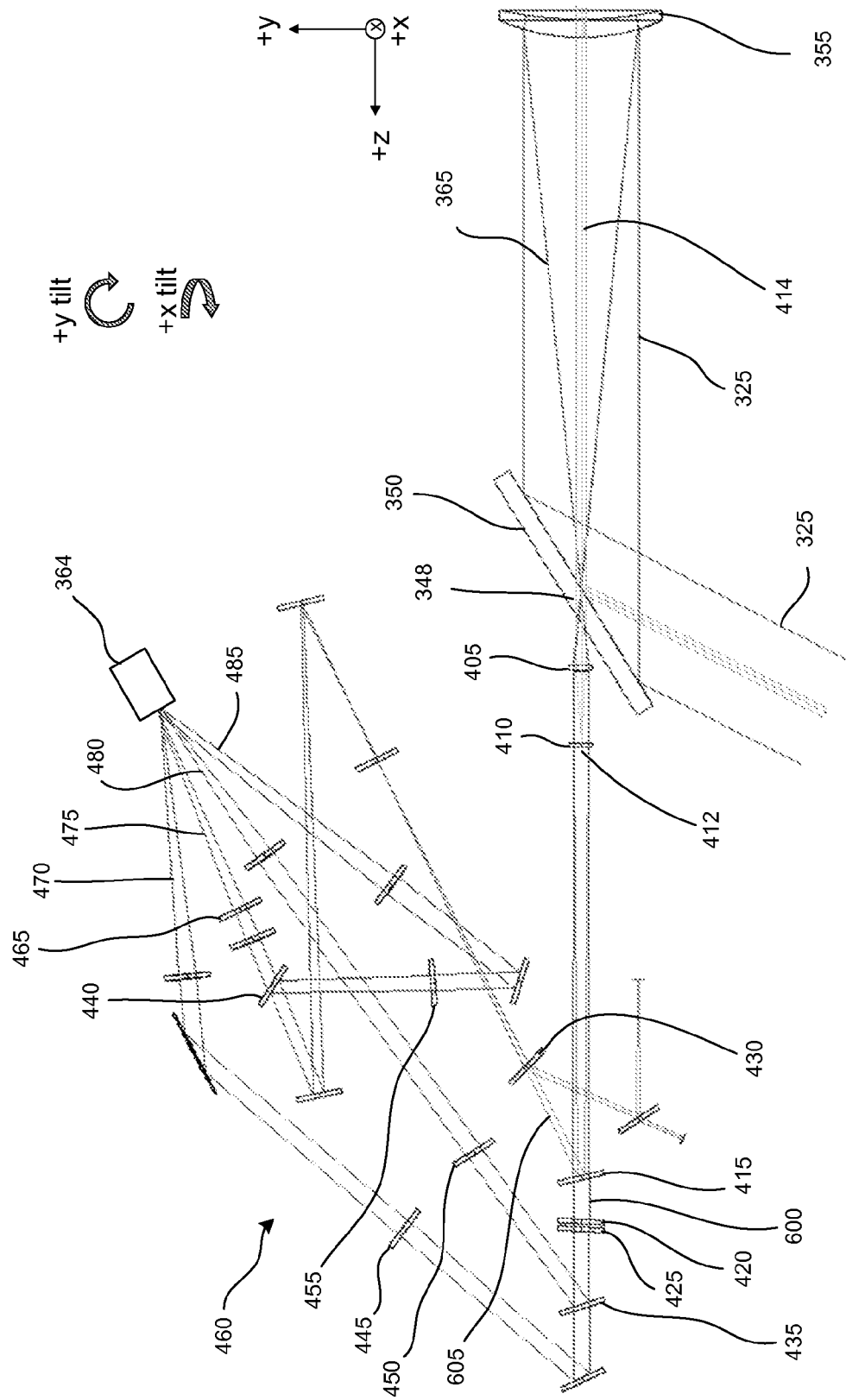
FIG. 4 is a block diagram of an exemplary metrology system that can be used in the beam delivery system of FIG. 3.
Figure 5A:
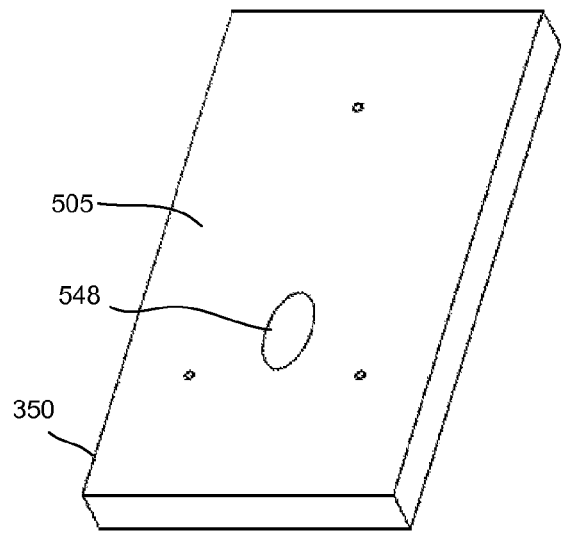
FIG. 5A is a perspective view of an exemplary mirror used in a focus assembly of the beam delivery system of FIG. 3.
Figure 5B:
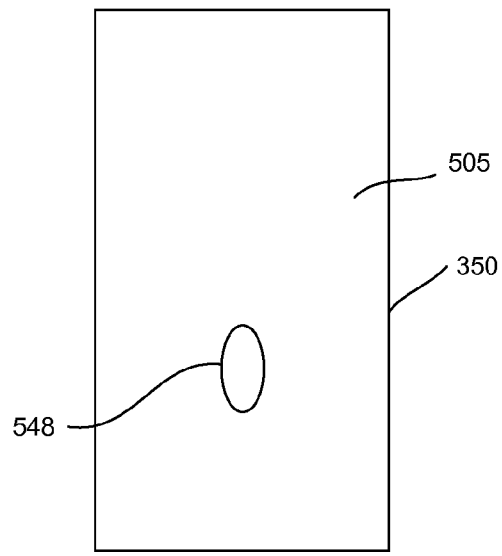
FIG. 5B is a top plan view of the mirror of FIG. 5A.
Figure 5C:
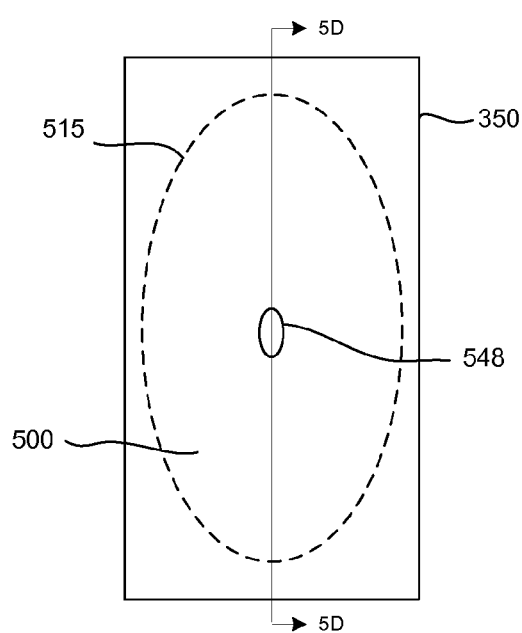
FIG. 5C is a bottom plan view of the mirror of FIG. 5A.
Figure 5D:
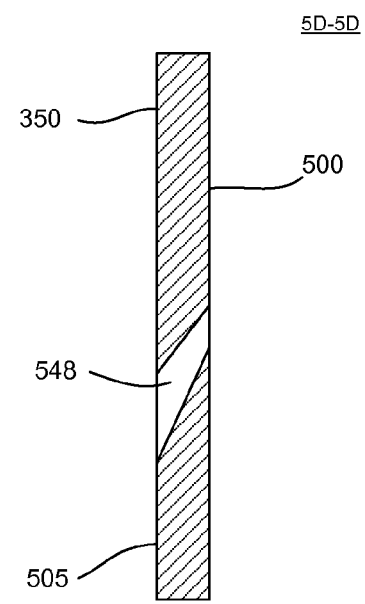
FIG. 5D is a side cross sectional view taken along line 5D-5D of FIG. 5C.

Referring to FIG. 4, an exemplary metrology system 460 receives light 365 for diagnostic purposes reflected from the lens 355 and focused onto an opening 348 of the mirror 350 so as to pass through the opening 348 and enter the metrology system 460.

Referring also to FIGS. 5A-D, the mirror 350 can be designed with a first plano surface 500 upon which the amplified light beam 325 impinges and is reflected toward the lens 355, and a second surface 505 opposing the first surface 500 and facing the metrology system 460. The mirror 350 includes a through opening 548 that intersects the first surface 500 and the second surface 505, the opening 548 having a generally conical shape that tapers from a larger cross sectional area at the second surface 505 to a smaller cross sectional area at the first surface 500.

The mirror 350 can be made of oxygen-free high conductivity (OFHC) copper and the first surface 500 can be finished in a maximum metal reflector (MMR) coating such as that produced by II-VI Infrared of Saxonburg, Pa. The mirror 350 has a clear aperture 515 that is large enough to reflect the entire amplified light beam 325 toward the lens 355.

Referring again to FIG. 4, the metrology system 460 includes a collimation or converging lens 405 and a flat optic or window 410. The collimation lens 405 can be a plano convex lens made of ZnSe. The flat optic 410 is defined by two planar surfaces that are fully transmissive to the light 365. The flat optic 410 can additionally include a relatively small central blocking region 412 that blocks light 414 that is reflected from the target material at the target location, as will be discussed below.

Figure 6:
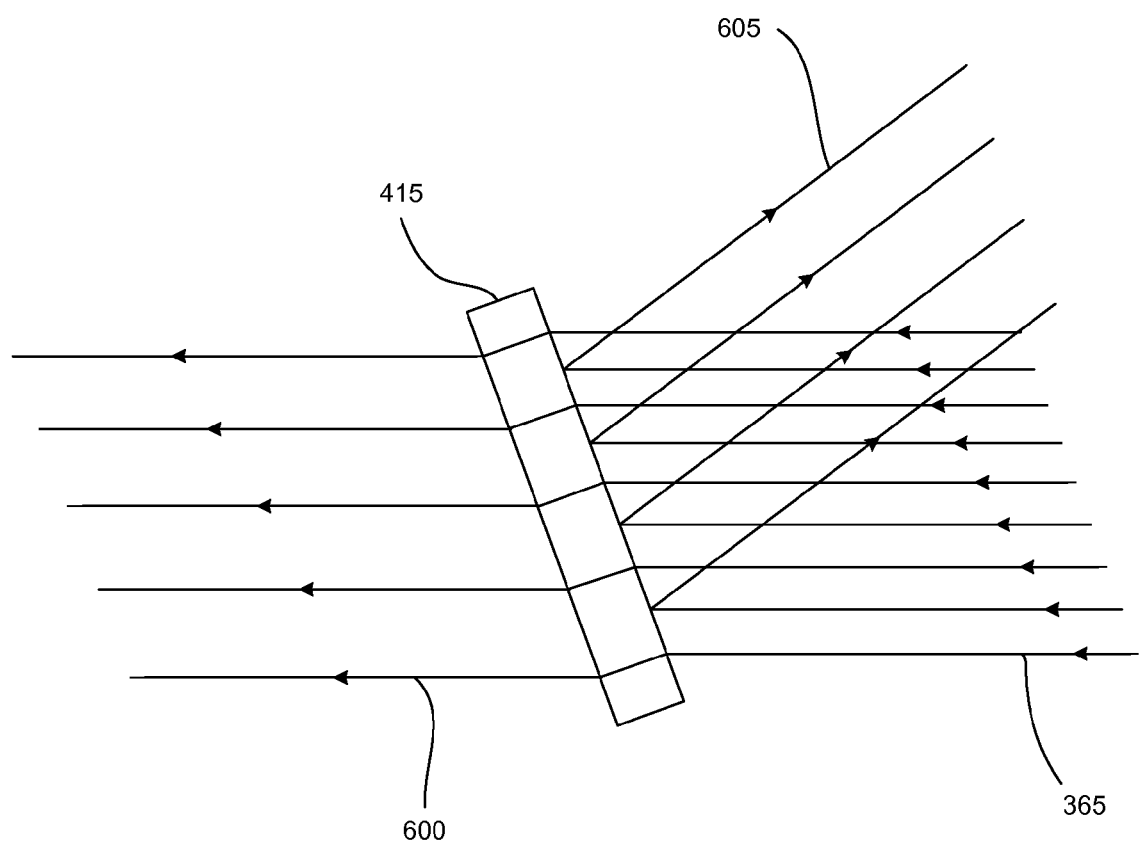
FIG. 6 is a diagram of a dichroic optical device that can be used in a metrology system of FIG. 3.

Referring also to FIG. 6, the metrology system 460 includes a dichroic optical device 415 (such as a dichroic mirror or dichroic filter) configured to separate the diagnostic portions of the light 365 by transmitting substantially all of one of the portions 600 and reflecting substantially all of the other of the portions 605 based on the wavelengths of each of the portions. In the implementations discussed below, the dichroic optical device 415 transmits substantially all (that is, greater than about 99%) of the guild laser beam and reflects substantially all (that is, greater than about 99%) of the amplified light beam. However, it should be noted that that dichroic optical device 415 can be configured to transmit substantially (that is, greater than 99%) the entire amplified light beam and reflect substantially (that is, greater than 99%) the entire guide laser beam.

Figure 7:
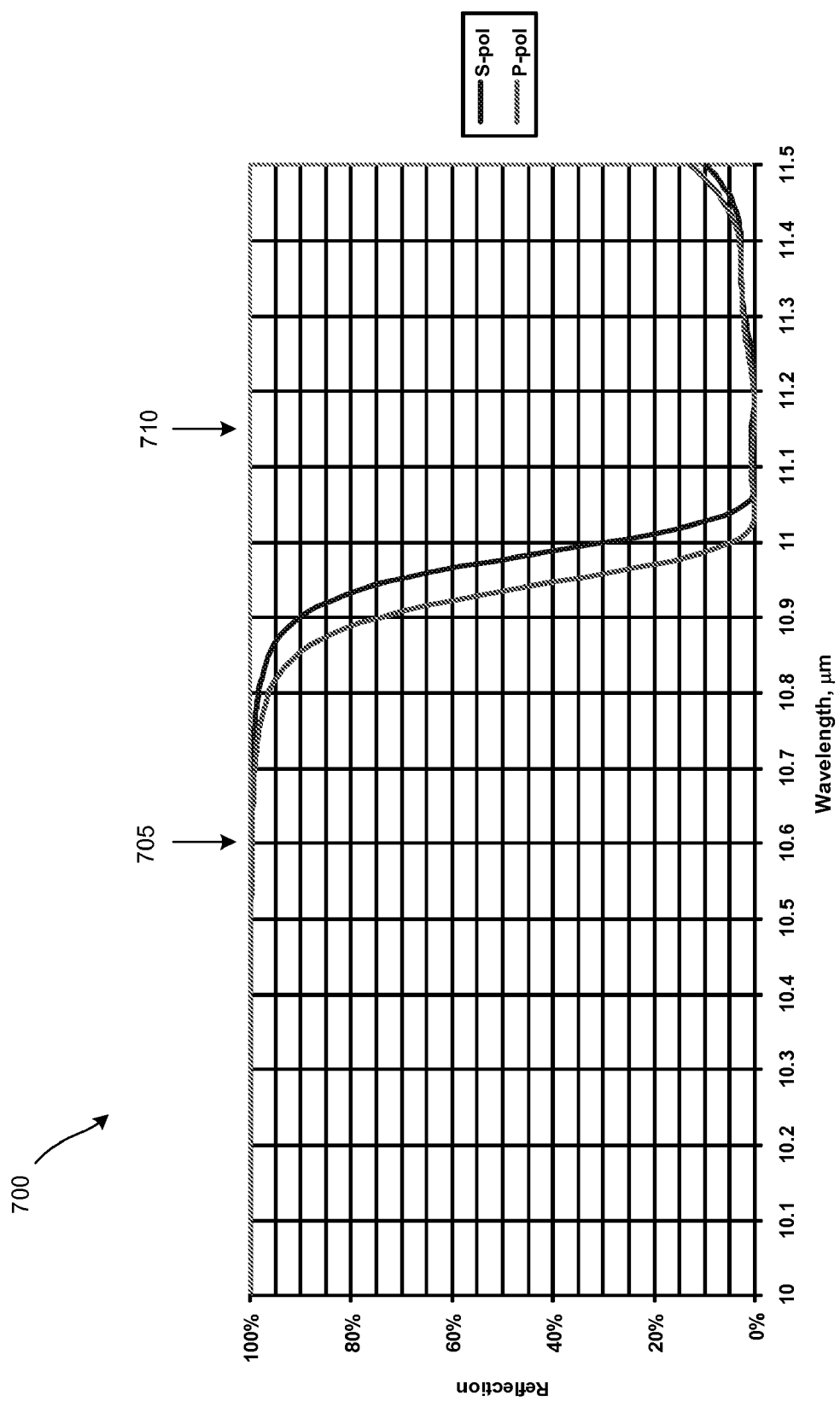
FIG. 7 is a graph of reflectance versus wavelength of S polarization light and P polarization light that impinges upon the dichroic optical device of FIG. 6.

As shown in the exemplary graph 700 of FIG. 7, in some implementations, if the amplified light beam 325 has a wavelength of about 10600 nm, then the dichroic optical device 415 is configured to reflect greater than 99% of light (including both p and s polarization components) at a wavelength of 10600 nm (indicated by arrow 705). Moreover, if the guide laser beam has a wavelength of about 11150 nm, then the dichroic optical device 415 is configured to transmit greater than 99% of light (including both p and s polarization components) at a wavelength of 11150 nm (indicated by arrow 710).

The metrology system 460 can also include filters 420, 425, 430 placed downstream of the dichroic optical device 415 to provide additional filtering of diagnostic portions. The filters 420, 425 can be additional dichroic optical devices placed in the path of the transmitted guide laser beam portion 600, for example, to reflect portions of the amplified light beam that might have been transmitted through the optical device 415. These filters 420, 425 can be used to adjust relative powers of the transmitted and reflected portions to obtain useful signals at the optical sensor 364. Such adjustment is useful for situations in which the amplified light beam 325 is significantly more powerful than the guide laser beam. In this case, because the amplified light beam 325 is significantly more powerful than the guide laser beam, it is possible that enough of the amplified light beam 325 transmits through the dichroic optical device 415 to make it more difficult to accurately measure features of the guide laser beam in the portion 600. The filter 430 can be an additional dichroic optical device placed in the path of the reflected amplified light beam portion 605, for example, to block unwanted light from the portion 605. Additionally, the filter 430 can be provided with an anti-reflective coating on its back surface to block light at another unwanted wavelength (for example, a wavelength of about 10200 nm) at which the laser system 115 can operate in. Moreover, the filters 420, 425, 430 can be angled relative to the beam path so that reflections are directed out of the beam path. Like the dichroic optical device 415, the filters 420, 425, 430 can be made of ZnSe.

The metrology system 460 also includes partial reflectors 435, 440 positioned along respective paths of the diagnostic portions 600, 605 to split each beam of the diagnostic portion 600, 605 into two beams, both of which are directed to the optical sensor 364. In this way, four beams 470, 475, 480, 485 are sent to the optical sensor 364, which can use these four beams to calculate four unknowns, the centroid of the diagnostic amplified light beam, the centroid of the diagnostic guide laser beam, the size of the diagnostic amplified light beam, and the size of the diagnostic guide laser beam. The four beams 470, 475, 480, 485 are directed such that they are spatially separated from each other as they strike the light sensitive surface of the optical sensor (for example, the four beams are separated from each other by dark regions), to permit separate analysis to be performed for each beam to determine the size and centroid of each beam.

The partial reflector 440 can be configured to reflect approximately 70% of and transmit approximately 30% of the amplified light beam portion 605. The partial reflector 435 can be configured to reflect approximately 30% of and transmit approximately 70% of the guide laser beam portion 600. Each of the partial reflectors 435, 440 can be made of ZnSe, or any other suitable material for the wavelengths involved. Additional or fewer beam splitting devices can be used depending on how many unknowns are to be determined by the analysis module 395 and/or the controller 155.

Moreover, while the partial reflectors 435, 440 are used for splitting the respective beams, other partial reflectors 445, 450, 455, 465 can be inserted into the paths to provide additional filtering, as needed. The metrology system 460 can include other components such as lenses for modifying the shape of the wavefront of the light and mirrors for redirecting and/or modifying the shape of the wavefront of the light. Lenses can be made of ZnSe and mirrors can be made of silicon (Si), but other materials are possible.

The optical sensor 364 can be any detector that has enough resolution to resolve features of the images formed from the diagnostic portions. For example, the optical sensor 364 can have a resolution of at least 100,000 nm. In some implementations, the optical sensor 364 is a pyroelectric array camera having a spectral range that encompasses the wavelengths of the diagnostic portions. For example, the pyroelectric array camera can be a Pyrocam™ III Series camera from Ophir-Spiricon Inc. of Logan, Utah. The pyroelectric array camera can include laser beam analysis software that can be used for other features and analysis capabilities. Or, the output from the pyroelectric array camera can be sent to the analysis module 395 or to the master controller 155 for analysis of the captured images.

Figure 8:
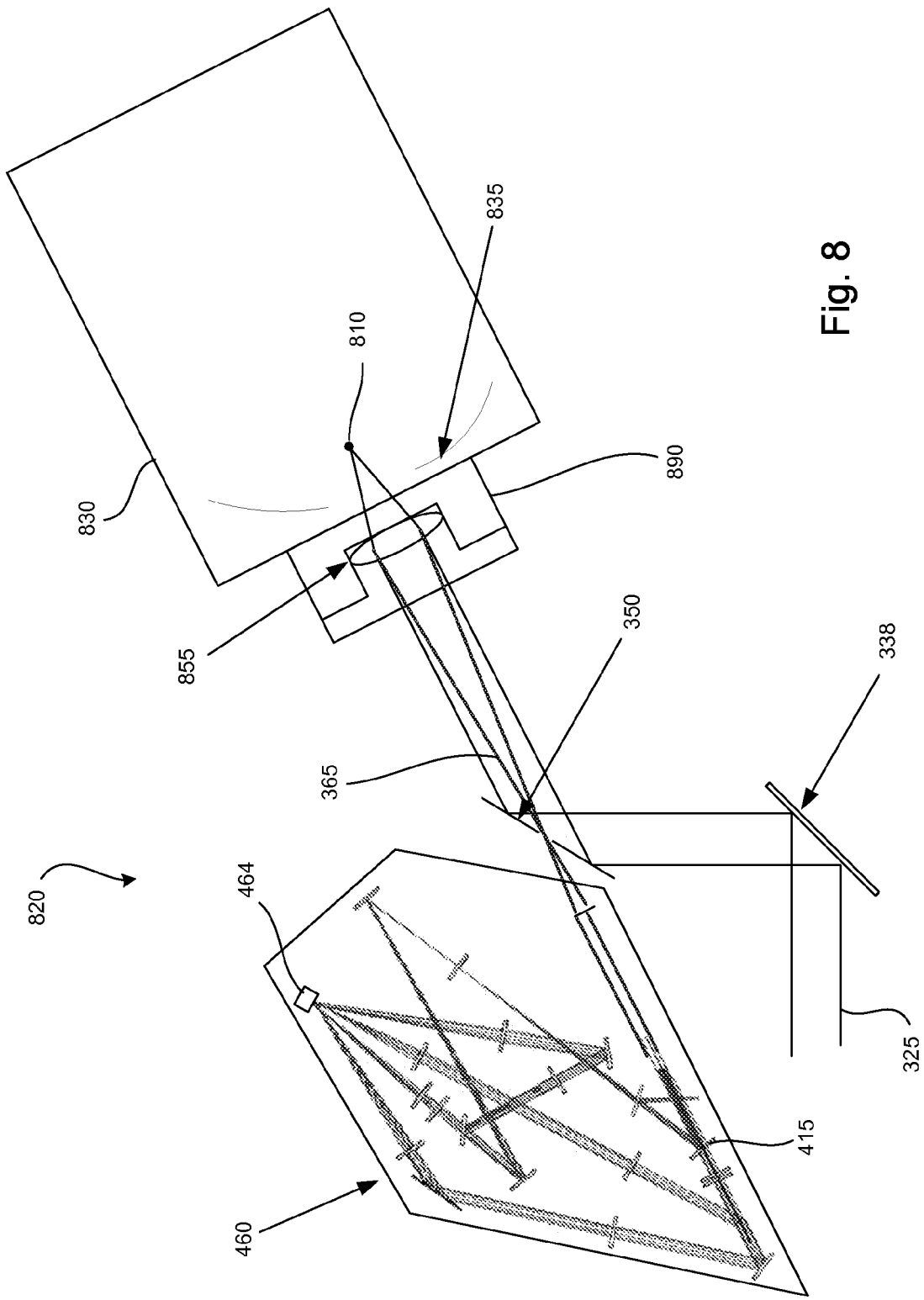
FIG. 8 is a block diagram of an exemplary focus assembly that includes the metrology system of FIG. 4.

Referring also to FIG. 8, the metrology system 460 is shown with an exemplary focus assembly 820 that includes the mirror 350 and a converging lens 855 configured and arranged to focus the amplified light beam 325 reflected from the mirror 350 to a target location 810 within the chamber 830. In this example, the converging lens 855 is a double convex lens. The lens 855 is placed in a wall 890 of the chamber 830 so that the lens 855 acts as a window between a vacuum maintained within the chamber 830 and a purged environment external to the chamber 830. A bellows can be placed between the vacuum chamber wall 890 and the lens 855 to facilitate movement of the lens 855 along one or more of three directions that are relative to a direction of the light beam 325; an axial direction or longitudinal direction that extends along the direction of the light beam 325 and the two directions that are transverse to the axial direction.

The metrology system 460 that captures the light 865 reflected from the lens 855 that is transmitted through the opening within the central region of the mirror 350, as discussed above.

The extreme ultraviolet light vacuum chamber 830 houses the extreme ultraviolet light collector 835 that is configured to collect extreme ultraviolet light emitted from the target material at the target location 810 when the amplified light beam 325 crosses the target location 810 and strikes the target material.

Figure 9:
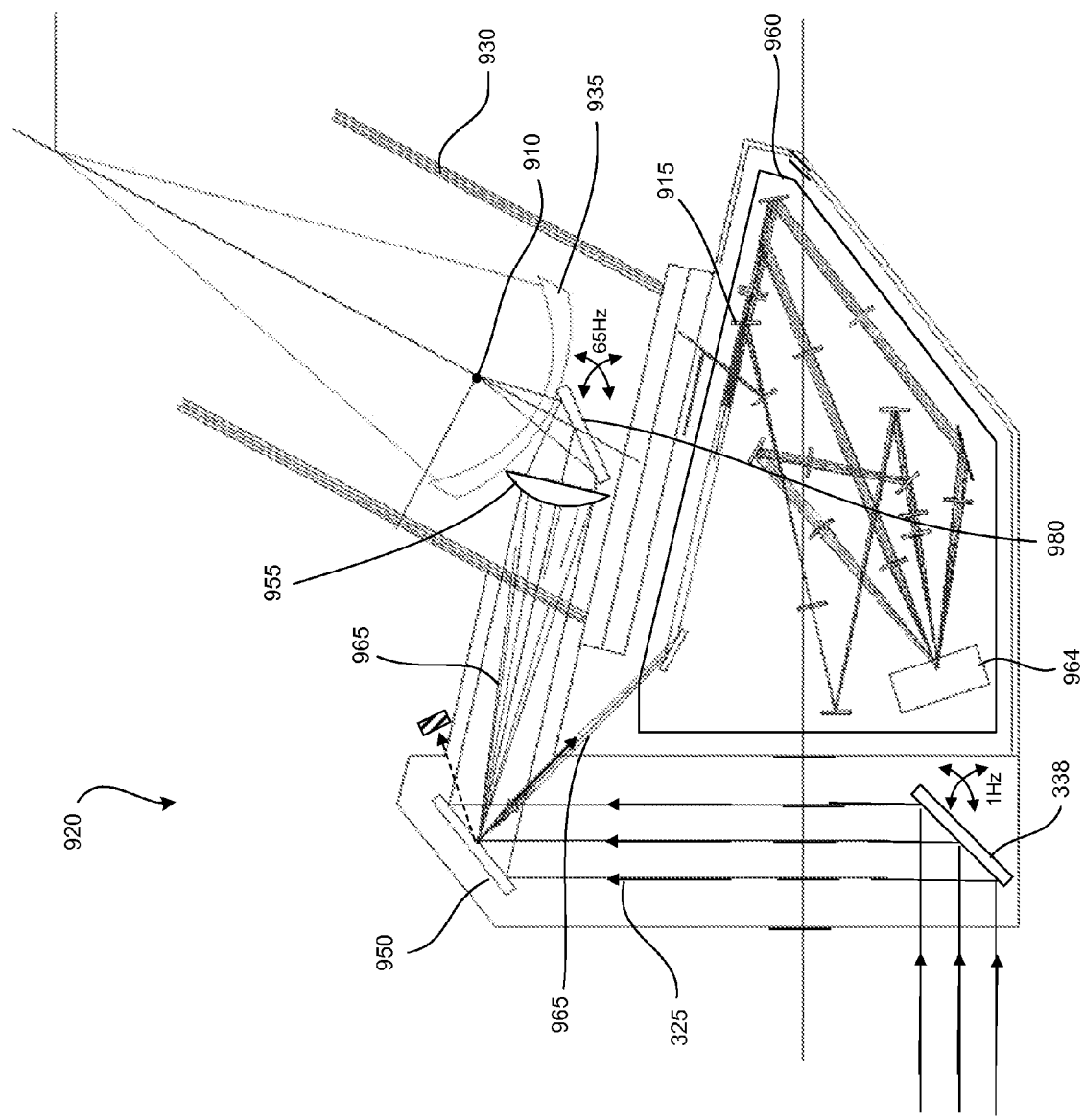
FIG. 9 is a block diagram of an exemplary focus assembly that includes the metrology system of FIG. 4.

Referring also to FIG. 9, in another implementation, a metrology system 960 is designed similarly to the metrology system 460 to capture light 965 reflected from a lens 955 of an exemplary focus assembly 920. In this implementation, the focus assembly 920 includes a pre-lens mirror 950 that is configured to reflect the reflected light 965 instead of transmitting the reflected light (as done by the mirror 350). The mirror 950 can be designed with a central region that is designed to reflect the amplified light beam 325 toward the lens 955 and reflect the light 965 toward the metrology system 960. The focus assembly 920 also includes an additional movable mirror 980 placed between the lens 955 and the target location 910 to re-direct the light from the lens 955 toward the target location 910.

The lens 955 can be a plano-convex aspheric lens having a numerical aperture of at least 0.25. In this implementation, the lens 955 is placed inside the extreme ultraviolet light vacuum chamber 930 though it can be placed into a wall of the chamber 930 to provide an air-tight seal. The extreme ultraviolet light vacuum chamber 930 houses the extreme ultraviolet light collector 935 that is configured to collect extreme ultraviolet light emitted from the target material at the target location 910 when the amplified light beam 325 crosses the target location 910 and strikes the target material.

Figure 10:
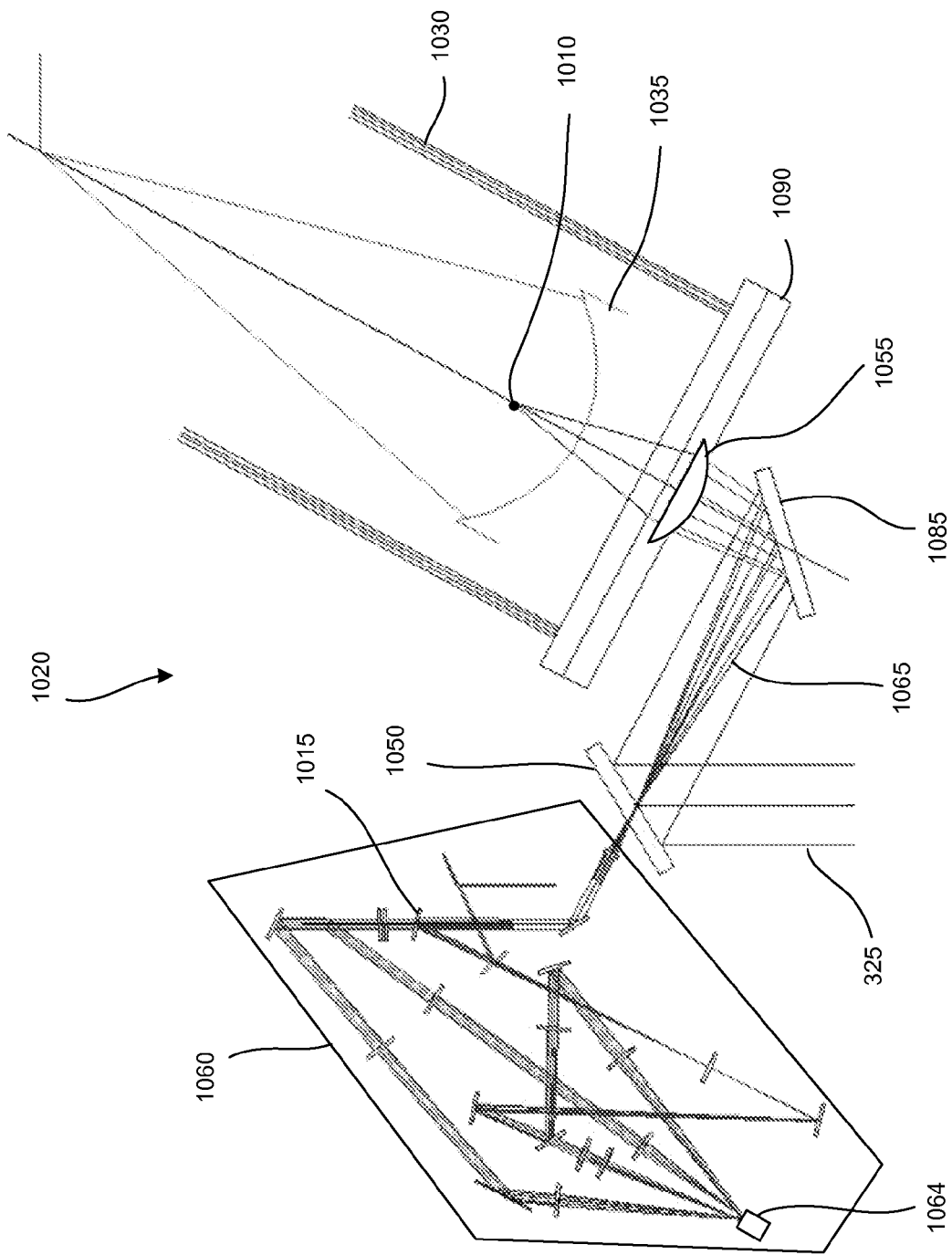
FIG. 10 is a block diagram of an exemplary focus assembly that includes the metrology system of FIG. 4.

Referring to FIG. 10, in another implementation, a focus assembly 1020 includes a mirror 1050 and a focusing element that includes a converging lens 1055 configured and arranged to focus the amplified light beam 325 reflected from the mirror 1050 and from another intermediate mirror 1085 to the target location 1010 within the chamber 1030. In this implementation, the converging lens 1055 is a plano-convex lens that is placed in a wall 1090 of the chamber 1030 so that the lens 1055 acts as a window between a vacuum maintained within the chamber 1030 and a purged environment external to the chamber 1030. A bellows (not shown) can be placed between the vacuum chamber wall 1090 and the lens 1055 to facilitate movement of the lens 1055 along one or more of the three directions that are relative to a direction of the light beam 325; an axial direction that extends along the direction of the light beam 325 and two directions that are transverse to the axial direction. The focus assembly 1020 also includes a metrology system 1060 that captures light 1065 reflected off the lens 1055 and directed through a central opening within the mirror 1050. The metrology system 1060 generally operates in the same manner as the other metrology systems in that it includes a dichroic optical device 1015 that separates a diagnostic amplified light beam from a diagnostic guide laser beam of the reflected light 1065.

The extreme ultraviolet light vacuum chamber 1030 houses the extreme ultraviolet light collector 1035 that is configured to collect extreme ultraviolet light emitted from the target material at the target location 1010 when the amplified light beam 325 crosses the target location 1010 and strikes the target material.

Referring again to FIG. 3, in use, the light 365 reflected from the lens 355 is directed through the optical components within the metrology system, where it is divided into four spatially separated beams that impinge upon the optical sensor 364.

For example, referring again to FIG. 4, the light 365 reflected from the lens 355 is focused to a focus region within the opening 348 of the mirror 350, and the light 365 passes through the opening 348 as an expanding beam toward the collimating lens 405. The collimating lens 405 provides enough divergence to the light 365 so that the light 365 exiting the lens 405 is substantially collimated. Moreover, the collimating lens 405 provides enough divergence to the light 414 reflected from the target material so that the light 414 exiting the lens 405 is converging to a focus region that is blocked by the central blocking region 412 of the flat optic 410.

As another example, in FIGS. 9 and 10, light 965, 1065 that is reflected from the lens 955, 1055 takes different paths, but in all cases, the light eventually impinges upon the dichroic optical device 415, 915, 1015 within the respective metrology system 460, 960, 1060.

After traveling through the optical components within the metrology system, the four diagnostic beams impinge upon the optical sensor 364, which in one implementation discussed above is a Pyrocam III camera from Ophir-Spiricon Inc. The image acquired by the optical sensor 364 is converted to a data format suitable for analysis by a processor (for example, the analysis module 395 and/or the master controller 155), and in some implementations can be in 116 format (signed 16 bit integer) having 14 useful bits. The image data output by the optical sensor 364 is sent to the analysis module 395.

Figure 11:
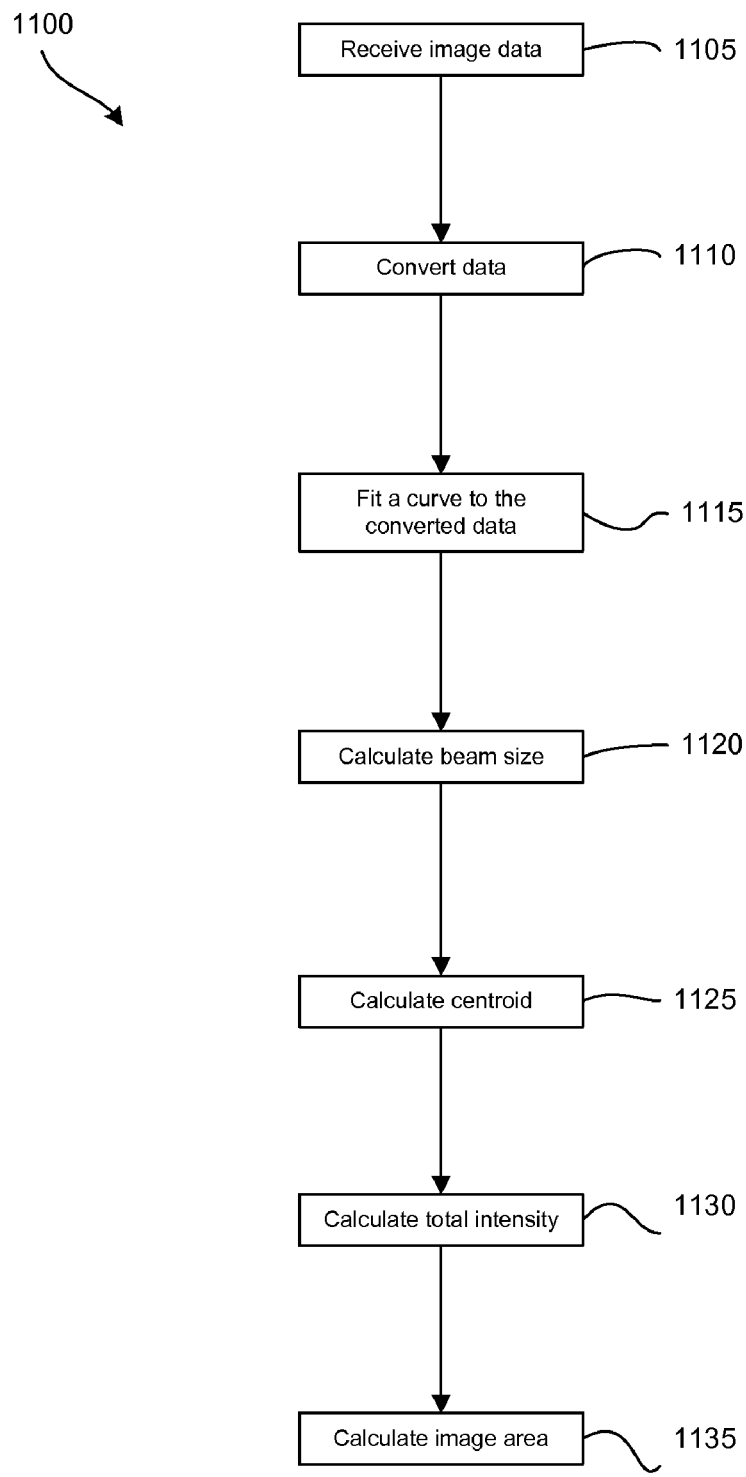
FIG. 11 is a flow chart of a procedure performed by the focus assembly.

Referring to FIG. 11, the analysis module 395 (or the master controller 155 if the analysis software is implemented within the controller 155) performs a procedure 1100 for calculating the size and centroid of each image that is capture, where the image is defined as having a distinct dark boundary around it. Initially, the analysis module 395 receives each set of image data from the optical sensor 364 (step 1105), where each set of image data represents one of the diagnostic beams impinging upon the optical sensor 364.

Next, the analysis module 395 performs data conversion on the image data to get it into a format suitable for further analysis (step 1110). Data conversion can include converting the data of the image into data in the format of an array. Data conversion can also include performing a bit swap, that is, to convert from one data format (such as 116 format) to another data format (such as U16 format, which is unsigned 16-bit integer format) to convert to positive pixel values. Data conversion can also include summing up elements within the array to get one dimensional arrays. For example, array elements in the Y image direction are summed up to obtain a one dimensional Y array and array elements in the X image direction are summed up to obtain a one dimensional X array. Additionally, data conversion can also include a baseline correction calculation that uses an average value of the intensity of a subset of pixels (for example, the first 3-10 pixel) to assure a zero baseline. Moreover, data conversion can include a normalization of the array to a maximum or mean value.

After data conversion (step 1110), the analysis module 395 constructs a function that closely fits the data points or elements of the array (step 1115) by, for example, interpolating the data of the array.

Next, the analysis module 395 calculates a beam size of the interpolated image data for each diagnostic beam along each of the X and Y directions (step 1120). The beam size can be calculated at a specified level, for example, at 5%, 10%, $1/e^2$, 20%, or 50%. Given the scale for the Pyrocam III is 0.1 mm/pixel, the values of the beam size can be reported in millimeters to the controller 155.

The analysis module 395 also calculates a centroid (which is the center of mass) of the interpolated image data for each diagnostic beam (step 1125). The centroid is calculated based on the intensity of each pixel and the coordinate at each pixel. Given the scale for the Pyrocam III is 0.1 mm/pixel, the values of the centroid can be reported in millimeters to the controller 155.

Additionally, the analysis module 395 can also calculate a total intensity of the image for each diagnostic beam (step 1130) and can also calculate an area of the image for each diagnostic beam (step 1135). The total intensity of the image can be calculated by integrating under the data obtained after performing array summing and zeroing the baseline or it can be calculated by integrating under the interpolated curve that is obtained after step 1115. The area of the image can be calculated based on the beam sizes in the X and Y position calculated in step 1120 at a specified level (for example, at $1/e^2$).

The output (for example, the beam sizes and the centroids) from the analysis module 395 can be sent to the master controller 155, which uses the output to tune one or more components of the beam delivery system. For example, tuning of the mirror 350 is done based on the 10600 nm diagnostic information (which is from the amplified light beam) and tuning of the lens 355 is done based on the 11150 nm diagnostic information (which is from the guide laser beam) without using the 10600 nm information. The mirror 350 and/or the lens 355 are tuned (adjusted) to optimize or increase the overlap of the amplified light beam 325 with the target material 310.

Other implementations are within the scope of the following claims.

Although the detector 165 is shown in FIG. 1 positioned to receive light directly from the target location 105, the detector 165 could alternatively be positioned to sample light at or downstream of the intermediate focus 145 or some other location.

In general, irradiation of the target material 114 can also generate debris at the target location 105, and such debris can contaminate the surfaces of optical elements including but not limited to the collection mirror 135. Therefore, a source of gaseous etchant capable of reaction with constituents of the target material 114 can be introduced into the chamber 130 to clean contaminants that have deposited on surfaces of optical elements, as described in U.S. Pat. No. 7,491,954, which is incorporated herein by reference in its entirety. For example, in one application, the target material can include Sn and the etchant can be $HBr$, $Br_2$, $Cl_2$, $HCl$, $H_2$, $HCF_3$, or some combination of these compounds.

The light source 100 can also include one or more heaters 170 that initiate and/or increase a rate of a chemical reaction between the deposited target material and the etchant on a surface of an optical element. For a plasma target material that includes Li, the heater 170 can be designed to heat the surface of one or more optical elements to a temperature in the range of about 400 to 550° C. to vaporize Li from the surface, that is, without necessarily using an etchant. Types of heaters that can be suitable include radiative heaters, microwave heaters, RF heaters, ohmic heaters, or combinations of these heaters. The heater can be directed to a specific optical element surface, and thus be directional, or it can be non-directional and heat the entire chamber 130 or substantial portions of the chamber 130.

What is claimed is:

1. An extreme ultraviolet light system comprising:
a drive laser system that produces an amplified light beam;
a target material delivery system configured to produce a target material at a target location within a vacuum space defined within a chamber, wherein the vacuum chamber houses an extreme ultraviolet light collector configured to collect extreme ultraviolet light emitted from the target material when the amplified light beam crosses the target location and strikes the target material;
a beam delivery system including a set of optical components and being configured to receive the amplified light beam emitted from the drive laser system and to direct the amplified light beam toward the target location;
a metrology system comprising:
a light collection system configured to collect at least a diagnostic portion of the amplified light beam not reaching the target location and at least a diagnostic portion of a guide laser beam not reaching the target location, the light collection system comprising a dichroic optical device configured to separate the diagnostic portions by transmitting substantially all of one of the portions and reflecting substantially all of the other of the portions, the at least two diagnostic portions having distinct wavelengths; and
an optical sensor that captures the at least two diagnostic portions separated by the dichroic optical device; and
a controller connected to the optical sensor and to at least one component within the beam delivery system to modify a position of the at least one component based on the output of the optical sensor.

2. The system of claim 1, wherein the beam delivery system comprises:
a beam expansion system that expands a size of the amplified light beam; and
a focusing element configured and arranged to focus the amplified light beam at the target location.

3. The system of claim 2, wherein the focusing element includes a converging aspheric lens.

4. The system of claim 3, wherein the converging lens is made of zinc selenide.

5. The system of claim 3, wherein the converging lens forms a pressure-resistant window of the vacuum chamber to separate the vacuum within the vacuum chamber from an environment external to the vacuum chamber.

6. The system of claim 3, wherein the beam delivery system comprises an actuation system mechanically coupled to the converging lens, wherein the actuation system is configured to receive a control signal from the controller and to move the converging lens to adjust a focus of the amplified light beam based on the control signal.

7. The system of claim 3, wherein the light collection system is configured to collect the amplified light beam reflected by a surface of the converging lens.

8. The system of claim 3, wherein the beam delivery system comprises a pre-lens mirror that redirects the amplified light beam from the beam expansion system toward the converging lens.

9. The system of claim 8, wherein the beam delivery system comprises an actuation system mechanically coupled to the pre-lens mirror, wherein the actuation system is configured to receive a control signal from the controller and to move the pre-lens mirror to adjust a focus of the amplified light beam based on the control signal.

10. The system of claim 1, wherein the controller is configured to provide an output signal to an actuation system coupled to the at least one component to modify the position of the at least one component to increase the overlap between the amplified light beam and the target material at the target location to thereby increase generation of extreme ultraviolet light within the chamber.

11. The system of claim 1, further comprising a guide laser that produces the guide laser beam;
wherein:
the amplified light beam is at a first distinct wavelength and the guide laser beam is at a second distinct wavelength; and
the dichroic optical device is configured to separate the amplified light beam diagnostic portion from the guide laser beam diagnostic portion by reflecting substantially all of the amplified light beam diagnostic portion and transmitting substantially all of the guide laser beam diagnostic portion.

12. A method for producing extreme ultraviolet light, the method comprising:
producing a target material at a target location within a vacuum defined by a chamber;
supplying pump energy to a gain medium of at least one optical amplifier in a drive laser system to produce an amplified light beam;
adjusting one or more properties of the amplified light beam and directing the amplified light beam through a set of optical components to the target location;
directing a guide laser beam to the target location;

collecting at least a portion of the amplified light beam that does not reach the target location and at least a portion of the guide laser beam that does not reach the target location; and separating the collected amplified light beam portion from the collected guide laser beam portion by directing the collected amplified light beam portion and the collected guide laser beam portion to a dichroic optical device such that one of the collected portions is transmitted through the dichroic optical device and the other of the collected portions is reflected from the dichroic optical device.

13. The method of claim 12, further comprising directing the separated portions to an optical sensor that outputs image data of the separated portions.

14. The method of claim 13, further comprising directing the image data of each of the separated portions to an analysis module, wherein the analysis module is configured to perform one or more of the following:

determine a beam size of the image data for each of the separated portions; and determine a centroid of the image data for each of the separated portions.

15. The method of claim 14, further comprising adjusting a position of one or more components of the optical component set based on one or more of the determined beam size and the determined centroid.

16. The method of claim 12, wherein directing the amplified light beam through a set of optical components includes:

reflecting the amplified light beam off a mirror; and directing the reflected amplified light beam through a focusing element that captures the amplified light beam and focuses the amplified light beam to the target location.

17. The method of claim 16, wherein collecting the portions includes collecting portions that are reflected off the converging lens and back through an opening within the mirror.

18. An extreme ultraviolet light system comprising:

a drive laser system that produces an amplified light beam;

a target material delivery system configured to produce a target material at a target location within a vacuum space defined within a chamber, wherein the vacuum chamber houses an extreme ultraviolet light collector configured to collect extreme ultraviolet light emitted from the target material when the amplified light beam crosses the target location and strikes the target material;

a beam delivery system configured to receive the amplified light beam emitted from the drive laser system and to direct the amplified light beam toward the target location, wherein the beam delivery system includes a set of optical components including a converging lens configured and arranged to focus the amplified light beam at the target location; and a metrology system comprising a light collection system configured to collect a portion of the amplified light beam reflected from the converging lens and a portion of a guide laser beam reflected from the converging lens, the light collection system comprising a dichroic optical device configured to separate the portions by transmitting a first of the portions and reflecting a second of the portions.

19. The system of claim 18, further comprising:

an optical sensor that captures the portions separated by the dichroic optical device; and a controller connected to the optical sensor and to at least one component within the beam delivery system to modify a position of the at least one component based on an output from the optical sensor.

20. The system of claim 19, wherein the controller is configured to provide an output signal to an actuation system coupled to the at least one component of the beam delivery system to modify the position of the at least one component to increase the overlap between the amplified light beam and the target material at the target location to thereby increase generation of extreme ultraviolet light within the chamber.

21. The system of claim 18, further comprising an actuation system mechanically coupled to the converging lens, wherein the actuation system is configured to receive a control signal from the controller and to move the converging lens to adjust a focus of the amplified light beam based on the control signal.

22. The system of claim 18, wherein the beam delivery system comprises a pre-lens mirror that redirects the amplified light beam from the beam expansion system toward the converging lens; wherein the amplified light beam portion and the guide laser beam portion reflected from the converging lens are directed through an opening within the pre-lens mirror before reaching the dichroic optical device.

23. The system of claim 22, wherein the beam delivery system comprises an actuation system mechanically coupled to the pre-lens mirror, wherein the actuation system is configured to receive a control signal from the controller and to move the pre-lens mirror to adjust a focus of the amplified light beam based on the control signal.

24. The system of claim 18, wherein the beam delivery system comprises a beam expansion system that expands a size of the amplified light beam; and the converging lens is configured and arranged to receive the expanded amplified light beam from the beam expansion system.

25. The system of claim 18, further comprising a guide laser that produces the guide laser beam;

wherein:

the amplified light beam is at a first distinct wavelength and the guide laser beam is at a second distinct wavelength; and the dichroic optical device is configured to separate the amplified light beam portion from the guide laser beam portion by reflecting substantially all of the amplified light beam diagnostic portion and transmitting substantially all of the guide laser beam diagnostic portion.

26. A method for producing extreme ultraviolet light, the method comprising:

producing a target material at a target location within a vacuum defined by a chamber;

supplying pump energy to a gain medium of at least one optical amplifier in a drive laser system to produce an amplified light beam;

adjusting one or more properties of the amplified light beam by directing the amplified light beam through a set of optical components including directing the amplified light beam through a converging lens configured and arranged to focus the amplified light beam at the target location;

directing a guide laser beam to the target location;

collecting at least a portion of the amplified light beam and at least a portion of the guide laser beam that reflect from a surface of the converging lens; and separating the collected amplified light beam portion from the collected guide laser beam portion by directing the collected amplified light beam portion and the collected guide laser beam portion to a dichroic optical device such that one of the collected portions is transmitted through the dichroic optical device and the other of the collected portions is reflected from the dichroic optical device.

27. The method of claim 26, further comprising directing the separated portions to an optical sensor that outputs image data of the separated portions.

28. The method of claim 27, further comprising directing the image data of each of the separated portions to an analysis module, wherein the analysis module is configured to perform one or more of the following:

determine a beam size of the image data for each of the separated portions; and determine a centroid of the image data for each of the separated portions.

29. The method of claim 28, further comprising adjusting a position of one or more components of the optical component set based on one or more of the determined beam size and the determined centroid.

30. The method of claim 26, wherein directing the amplified light beam through a set of optical components includes reflecting the amplified light beam off a mirror prior to directing the amplified light beam through the converging lens.

31. The method of claim 30, wherein collecting the portions includes collecting portions that are reflected off the converging lens and back through an opening within the mirror.

* * * * *